United States Patent
Kapp et al.

(10) Patent No.: US 11,368,436 B2
(45) Date of Patent: Jun. 21, 2022

(54) COMMUNICATION PROTOCOL

(71) Applicant: BAE SYSTEMS INFORMATION AND ELECTRONIC SYSTEMS INTEGRATION INC., Nashua, NH (US)

(72) Inventors: Benjamin Kapp, San Diego, CA (US); Jibu Abraham, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 504 days.

(21) Appl. No.: 16/114,654

(22) Filed: Aug. 28, 2018

(65) Prior Publication Data

US 2020/0076772 A1 Mar. 5, 2020

(51) Int. Cl.
*H04L 9/40* (2022.01)
*H04L 9/08* (2006.01)

(52) U.S. Cl.
CPC ........ *H04L 63/0428* (2013.01); *H04L 9/0869* (2013.01); *H04L 63/0421* (2013.01)

(58) Field of Classification Search
CPC ............... H04L 63/0428; H04L 9/0869; H04L 63/0421; H04L 9/0863; H04L 9/0656; H04L 2209/08
See application file for complete search history.

(56) References Cited

U.S. PATENT DOCUMENTS

| | | | |
|---|---|---|---|
| 6,021,203 A | 2/2000 | Douceur et al. | |
| 7,010,590 B1 * | 3/2006 | Munshi | H04L 63/0464 709/224 |
| 7,464,171 B2 * | 12/2008 | Rambhia | H04L 9/36 709/223 |
| 7,634,199 B2 * | 12/2009 | Imoto | H04B 10/2537 398/159 |
| 8,347,084 B2 * | 1/2013 | Tavernier | H04L 63/18 713/162 |
| 8,605,708 B2 * | 12/2013 | Nakamura | H04W 16/28 370/347 |
| 9,519,776 B2 * | 12/2016 | Wood | G06F 21/55 |

(Continued)

FOREIGN PATENT DOCUMENTS

WO 01/61922 A2 8/2001
WO 2013/174869 A1 11/2013

OTHER PUBLICATIONS

Jeon et al. (Poster: Obfuscation of Critical Infrastructure Network Traffic using Fake Communication, ACSAC '13, 2013, 2 pages) (Year: 2013).*

(Continued)

*Primary Examiner* — Oleg Korsak
(74) *Attorney, Agent, or Firm* — Sand, Sebolt & Wernow LPA; Gary McFaline

(57) ABSTRACT

A zero knowledge communications protocol is provided that can unconditionally secure communications sent through a communications network by encrypting all messages, continuously sending noise messages through the network, and routing all network activity through an anonymity network. This combination of components prevent an eavesdropper on the network from garnering any information about when a communication is sent, the contents and statistics of a communication, the sender, or the intended recipient of the communication.

22 Claims, 6 Drawing Sheets

(56) References Cited

U.S. PATENT DOCUMENTS

| | | | | |
|---|---|---|---|---|
| 9,590,951 | B2* | 3/2017 | Tomkow | H04L 9/0656 |
| 9,942,247 | B2* | 4/2018 | Seul | H04L 45/20 |
| 9,990,249 | B2* | 6/2018 | Durham | G06F 12/0886 |
| 10,311,243 | B2* | 6/2019 | Calmon | G06F 21/6209 |
| 10,491,575 | B2* | 11/2019 | Verzun | H04L 9/0662 |
| 10,643,596 | B2* | 5/2020 | Fong | H04L 9/0869 |
| 10,666,623 | B2* | 5/2020 | Ross | H04L 63/0428 |
| 2015/0244828 | A1* | 8/2015 | Heydon | H04H 20/71 709/232 |
| 2017/0019248 | A1* | 1/2017 | Mustafa | H04L 9/008 |
| 2017/0033925 | A1* | 2/2017 | DeNeut | H04L 9/0869 |
| 2018/0241727 | A1* | 8/2018 | Verzun | H04L 9/0662 |

OTHER PUBLICATIONS

International Search Report, PCT/US19/48137, dated Jun. 5, 2020, 11 pages.

Yoosuk Jung et al: "Unobservable Mix: Hiding Communication with Uniform Shape of Network Traffic", Convergence Information Technology, 2007. International Conference On, IEEE, Piscataway, NJ, USA, Nov. 21, 2007 (Nov. 21, 2007), pp. 2386-2393, XP031225553, ISBN 378-0-7695-3038-3 * Abstract Section 2 and subsections *.

Diaz Claudia et al: "Reasoning About the Anonymity Provided by Pool Mixes That Generate Dummy Traffic" In: "Pattern Recognition: 5th Asian Conference, ACPR 2019, Auckland, New Zealand, Nov. 26-29, 2019, Revised Selected Papers, Part II", May 23, 2004 (May 23, 2004), Springer International Publishing, Cham, XP055909007, ISSN 3302-9743 ISBN: 978-3-030-41298-2 vol. 3200, pp. 309-325, DOI: 10.1007/978-3-540-30114-1_22, Retrieved from the Internet: URL:https://link.springer.com/content/pdf/10.1007/978-3-540-30114-1_22.pdf> * Abstract Sections 1-4 *.

Chen Chen et al.: "TARANET: Traffic-Analysis Resistant Anonymity at the NETwork layer", arxiv.org, Cornell University Library, 201 Olin Library Cornell University Ithaca, NY 14853, Feb. 23, 2018 (Feb. 23, 2018), XP081218058, * Abstract Sections 1-4 *.

EP Search Report, EP No. 19856980.8, dated Apr. 13, 2022, 9 pages.

* cited by examiner

COMMUNICATION PROTOCOL

BACKGROUND

Technical Field

The present disclosure relates to a secure electronic communications protocol. More particularly, in one example, the present disclosure relates to an electronic communications protocol that can prevent an eavesdropper from gaining any information about the communications. In another example the present disclosure, relates to a secure electronic communications protocol utilizing one time pad encryption, constant background communication, and unconditional anonymity to prevent an eavesdropper from obtaining any knowledge regarding the communications.

Background

In telecommunication events, a communication protocol is a system of rules that allow two or more entities of a communications system to transmit information via any kind of variation of a physical quantity. The protocol defines the rules syntax, semantics and synchronization of communication and possible error recovery methods. Protocols may be implemented by hardware, software, or a combination of both. Communicating systems use well-defined formats (protocol) for exchanging various messages. Each message has an exact meaning intended to elicit a response from a range of possible responses for that particular situation. The specified behavior is typically independent of how it is to be implemented.

Protecting the contents of private communications has long been a concern addressed by both sender and recipient alike. Intercepting messages can yield a virtual treasure trove of information about the sender and the recipient. Learning details about the messages themselves, even without access to the contents, can give an eavesdropper valuable information. The who, what, when, and where a message is sent can be just as important as the contents thereof. An eavesdropper armed with this information can often deduce the contents of the message. Thus, protecting this information can be just as vital to protecting the communications as securing the contents themselves.

With the advent of modern technology and the rapid advances in computers, both hardware and software, intercepting communications and/or learning information about communications has only become easier, while security has become more difficult to implement.

Encryption technology is ever evolving in response to threats that arise on a daily basis. It is common to see news reports of major companies and government agencies being hacked, with data being compromised. The frequencies of these attacks and data breaches seem to be ever increasing as computer technology and human skill also advance.

Much of cryptology in present use is based on factoring large prime numbers, which is generally viewed as extremely difficult, however, not impossible to crack. Instead, with proper computational ability and enough time, these encryption techniques are fundamentally breakable. Thus, given enough computing power and enough time, every system based on the factoring of large prime numbers is vulnerable and can be breached. It is the latest trend that security experts have deemed systems as "assume breached," which means that one should assume that their system has already been compromised and plan accordingly.

In cryptography, a one-time pad (OTP) is an encryption technique that cannot be cracked, but requires the use of a one-time pre-shared key the same size as, or longer than, the message being sent. In this technique, a plaintext is paired with a random secret key (also referred to as a one-time pad). Then, each bit or character of the plaintext is encrypted by combining it with the corresponding bit or character from the pad using modular addition. If the key is truly random, is at least as long as the plaintext, is never reused in whole or in part, and is kept completely secret, then the resulting ciphertext will be impossible to decrypt or break. It has also been proven that any cipher with the perfect secrecy property must use keys with effectively the same requirements as OTP keys. Digital versions of one-time pad ciphers are used by nations for virtually all top secret diplomatic and military communication, but the problems of secure key distribution have made them impractical for less critical applications.

SUMMARY

Issues continue to exist with current encrypted communication systems as the "assume breached" status requires the assumption that the system has been compromised and the impracticality of current OTP encryption. Thus, a need continues to exist for an improved encrypted communication system. In accordance with one aspect, an exemplary embodiment of the present disclosure provides a communications protocol that secures the contents of a communications message while simultaneously sending a stream of noise messages, or noise, to mask when, where, how, why, by whom, and to whom a communications message is sent. In one particular implementation, the contents of a communications message between a sender and a recipient is unconditionally secure.

In one aspect, an exemplary embodiment of the present disclosure may provide a method of providing secure communications comprising: generating noise data; transmitting the noise data through a communication network at a first defined transmission protocol to at least one other network participant; generating a communications message by a sender and encrypting the communications message with an encryption protocol to create an encrypted message adapted to be decrypted with a key; transmitting the encrypted message through the communication network at a second defined transmission protocol substantially identical to the first transmission protocol to the plurality of network participants, such that an eavesdropper cannot distinguish the encrypted message from the noise data; and, decrypting the encrypted message by at least one intended recipient with the key to obtain the communications message. This exemplary embodiment or another exemplary embodiment may further provide continuing to transmit the noise data through the communication network subsequent to transmitting the encrypted message. This exemplary embodiment or another exemplary embodiment may further provide dividing bandwidth into rounds with n shares, wherein n is equal to the number of network participants, wherein the network participants comprises at least one of: the sender; the at least one intended recipient; and the at least one other network participant; assigning, randomly, at least one share to all network participants; and transmitting, in rounds, one of the noise data and the encrypted message. This exemplary embodiment or another exemplary embodiment may further provide receiving all noise data and encrypted messages by at least one network participants; and attempting to decrypt all noise data and encrypted messages with the key. This exemplary embodiment or another exemplary embodiment may further provide encrypting the noise data with the encryption protocol prior to transmitting the noise data through the communication network. This exemplary embodiment or another exemplary embodiment may further provide wherein the communications network is an anonymity network for the plurality of network participants, and wherein n is the number of network participants; and precluding a determination of which participant sent the encrypted message without more than a guess having a 1/n percent probability of success. This exemplary embodiment or another exemplary embodiment may further provide encrypting the encrypted messages and encrypted noise data with identical encryption protocol, wherein the encryption protocol is an unconditionally secure process; and ensuring that a majority of activity across the anonymity network appears uniform to an eavesdropper. This exemplary embodiment or another exemplary embodiment may further provide wherein the unconditionally secure process further comprises: a One Time Pad (OTP) process. This exemplary embodiment or another exemplary embodiment may further provide encrypting the messages and noise data with a first layer of encryption prior to encrypting the messages and noise data with the OTP process to create a double encrypted message; and creating an encryption scheme where all possible decryptions are equally likely. This exemplary embodiment or another exemplary embodiment may further provide generating encrypted noise data from each participant in the anonymity network and transmitting the encrypted noise data from each participant to all other participants in the anonymity network. This exemplary embodiment or another exemplary embodiment may further provide maintaining activity across the anonymity network at a constant level at all times. wherein creating an encryption scheme where all possible decryptions are equally likely further comprises: changing, randomly, each bit of data within each of the communications message and the noise data to a 1 or a 0; and switching, randomly, every bit is randomly switched on (1) or off (0) to output a completely random number from the OTP process. This exemplary embodiment or another exemplary embodiment may further provide composing, randomly, a one-time key with an equal number of bits as the communications message. This exemplary embodiment or another exemplary embodiment may further provide wherein the one-time key is composed in advance of generating the communications message; and further comprising: delivering, securely, the one-time key to the intended recipient of the encrypted message prior to transmitting the encrypted message. This exemplary embodiment or another exemplary embodiment may further provide effecting only a portion of the one-time key to be used to decrypt the encrypted message. This exemplary embodiment or another exemplary embodiment may further provide wherein the method is implemented in a random oracle.

In one aspect, an exemplary embodiment of the present disclosure may provide a non-transitory computer readable storage medium having instructions encoded thereon, that when executed by at least one processor, implement operations to securely and confidentially exchange messages between a sender and an intended recipient, the instructions including: identify a communications message generated by the sender and encrypt the communications message with an encryption protocol to create an encrypted message; send the encrypted message through a network to a plurality of network participants; generate noise data and encrypt all noise data with the encryption protocol to create encrypted noise; transmit the encrypted noise through a network between the plurality of network participants; receive encrypted noise and encrypted messages from each network recipient in the plurality of network participants; mask bandwidth discrepancies related to a message transmission; effect the recipient to attempt to decrypt encrypted noise and encrypted messages with a unique key that was pre-provided; effect the delivery of the communications message that is successfully decrypted to at least one intended recipient; and effect all other recipients to ignore all failed decryption attempts and discard all ignored messages and noise.

In yet another aspect, an exemplary embodiment of the present disclosure may provide a method of providing secure communications comprising: generating random noise data by a network participant; transmitting the noise data through a communication network at a first defined transmission protocol to at least one other network participant; generating at least one communications message by a sender and encrypting the communications message with an encryption protocol to create an encrypted message adapted to be decrypted with a key; transmitting the encrypted message through the communication network using the first defined transmission protocol to the plurality of network participants, such that an eavesdropper cannot distinguish the encrypted message from the noise data; and decrypting the encrypted message by at least one intended recipient with the key to obtain the communications message. This exemplary method or another exemplary method may further provide continuing to transmit the noise data through the communication network and intermittently transmit the encrypted message. This exemplary method or another exemplary method may further provide dividing a bandwidth into rounds with n shares, wherein n is equal to a number of network participants, wherein the network participants comprise at least one of: the sender; the intended recipient; and any number of additional network participants; assigning at least one share to at least one sender; and transmitting, in rounds, one of the noise data and the encrypted message. This exemplary method or another exemplary method may further provide receiving all noise data and encrypted messages by at least one network participant; and attempting to decrypt all noise data and encrypted messages with the key. This exemplary method or another exemplary method may further provide encrypting the noise data with the encryption protocol prior to transmitting the noise data through the communication network. This exemplary method or another exemplary method may further provide wherein the communication network is an anonymity network for the network participants, wherein n is equal to the number of network participants; which precludes a determination of which participant sent the encrypted message. This exemplary method or another exemplary method may further provide generating encrypted noise data from each participant in the anonymity network and transmitting the encrypted noise data from each participant to all other participants in the anonymity network. This exemplary method or another exemplary method may further provide encrypting the encrypted messages and noise data with an identical encryption protocol, wherein the encryption protocol is an unconditionally secure process; and ensuring that activity across the communication network appears uniform to an eavesdropper. This exemplary method or another exemplary method may further provide wherein the unconditionally secure process provides for all decryptions being equally likely. This exemplary method or another exemplary method may further provide encrypting the encrypted messages with the unconditionally secure process and providing a doubly encrypted message. This exemplary method or another exemplary method may further provide wherein creating the encryption protocol where all decryptions are equally likely further comprises: changing, randomly, each bit of data within each of the communications message and the noise data to a 1 or a 0; and switching, randomly, wherein every bit is randomly switched on (1) or off (0) to output a completely random number from the unconditionally secure process. This exemplary method or another exemplary method may further provide maintaining activity across the communication network at a constant level at all times. This exemplary method or another exemplary method may further provide wherein the key is a random one-time key with an equal number of bits as the communications message. This exemplary method or another exemplary method may further provide delivering, securely, the one-time key to the intended recipient of the encrypted message.

In yet another aspect, an exemplary embodiment of the present disclosure may provide a method of providing secure communications comprising: continuously generating noise data; continuously sending a stream of the noise data through an anonymity network to network participants; generating at least one communications message; encrypting the communications message using an unconditionally secure process providing an encrypted communications message; sending the encrypted communications message through the anonymity network to network participants; receiving the noise data and the encrypted communications message by network participants; running a decryption protocol on the noise data and the encrypted communications message using a key; and ignoring failed decryption attempts. This exemplary method or another exemplary method may further provide wherein there are no observable temporal difference when switching between sending the encrypted communications message and the noise data. This exemplary method or another exemplary method may further provide sending the noise data and the communications message to a central hub. This exemplary method or another exemplary method may further provide delivering communications messages that are successfully decrypted to at least one intended recipient.

In yet another aspect, an exemplary embodiment of present disclosure may provide a computer readable storage medium having instructions encoded thereon, that when executed by at least one processor, implement operations to securely and confidentially exchange messages between a sender and at least one intended recipient, the instructions including: identify at least one communications message generated by the sender and encrypt the communications message with an encryption protocol to create an encrypted message; send the encrypted message through a network to a plurality of network participants; generate noise data; transmit the noise data through the network to the network participants; mask bandwidth discrepancies related to a message transmission of the noise data and the encrypted message; receive at least one of the noise data and the encrypted message; attempt by at least one intended recipient to decrypt the noise data and the encrypted message with a key; deliver the communications message that is successfully decrypted to the at least one intended recipient; and ignore failed decryption attempts.

In yet another aspect, an exemplary embodiment of the present disclosure may provide a secure communications system, comprising: a noise generator; a multiplexer coupled to the noise generator, wherein the noise generator generates noise data that is an input to the multiplexer; a communications message generated by a user, wherein the communications message is an input to the multiplexer, and wherein the communications message is encrypted by an encryption module; an anonymous network that receives the noise data and the encrypted communications message; and a decryption module for decrypting the encrypted communications message, wherein the encrypted communications message and the noise data are transmitted using similar transmission protocols such that they are indistinguishable. This exemplary embodiment or another exemplary embodiment may further provide wherein the encryption module is an unconditional confidentiality encryption module and the communications message is encrypted prior to input to the multiplexer, and wherein the decryption module is an unconditional confidentiality decryption module. This exemplary embodiment or another exemplary embodiment may further provide wherein the communications message is encrypted prior to input to the multiplexer and further comprising a second encryption by an unconditional confidentiality encryption module encrypting the noise data and the encrypted communications message after the multiplexer, and further comprising an unconditional confidentiality decryption module decrypting the second decryption message prior to the decryption module decrypting the communications message. This exemplary embodiment or another exemplary embodiment may further provide wherein the communications message is encrypted prior to input to the multiplexer and further comprising a second encryption by an unconditional confidentiality encryption module encrypting the encrypted communications message before the multiplexer, and wherein the decryption module is unconditional confidentiality decryption module decrypting the communications message. This exemplary embodiment or another exemplary embodiment may further provide wherein the encryption module is an unconditional confidentiality encryption module and the noise data and the communications message are encrypted after the multiplexer, and wherein the decryption module is an unconditional confidentiality decryption module.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

A communication system in accordance with one aspect of the present disclosure is shown generally at 1. The communication system 1 includes a communication protocol between a sender 10 and a recipient 12 for sending a communications message there between. In one exemplary implementation, the communication protocol utilizes at least three components to secure not only the contents of a message, but also any information relating to the message itself. In some instances, the communications message is unconditionally secured. The communications protocol reduces or eliminates the likelihood that an eavesdropper 19 (hereinafter referred to as "Eve" 19) will gain any knowledge or information about the communications being sent.

Figure 1:
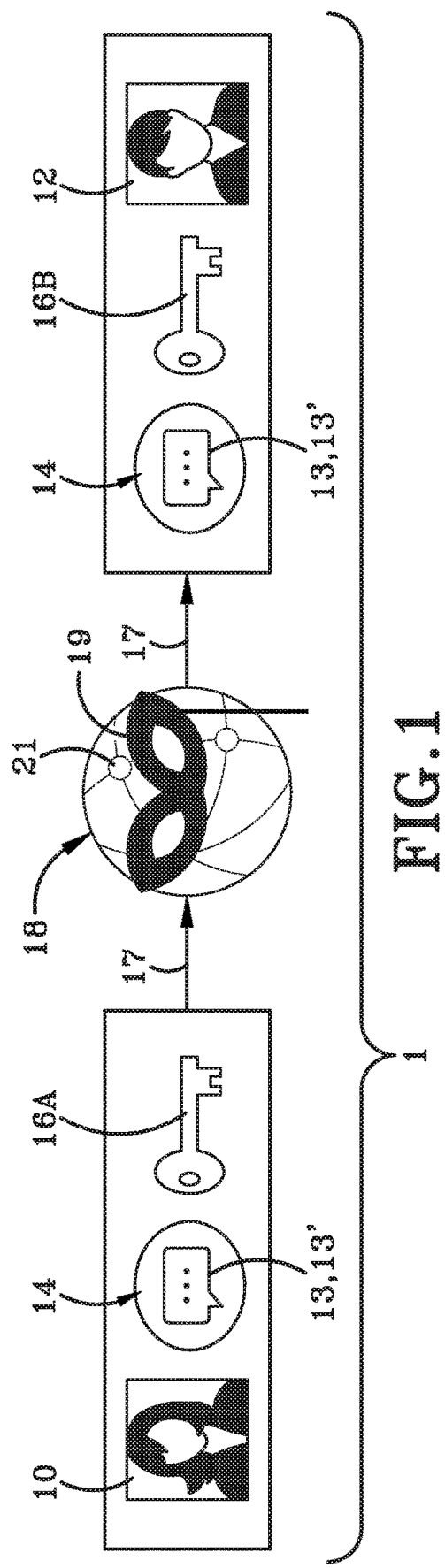
FIG. 1 is a diagrammatic representation of the path a secure communications message takes from sender to recipient in accordance with one embodiment of the disclosure.

FIG. 1 depicts the communication system 1 including the sender 10 (which may also be referred to herein as "Alice" 10), a communications message 13 which can be encrypted via an unconditionally secure process, such as a One Time Pad algorithm (OTP) 14, to generate an encrypted message 13', a sender key 16A, a network 18, Eve 19, the recipient (which may also be referred to as "Bob" 12), a recipient key 16B. The communications message 13 moves along a communication pathway 17 simultaneous to noise data 21 also moving along pathway 17 or other pathways through network 18.

In one example the communications network 18 may be the Internet where data travels along pathways that can be fixed or dynamic and can include servers that receive and transmit the data. The present system may define an anonymity network 18 that hides the communications 13 as well as information about the sender 10, recipient 12, or the format of message 13. Eve 19 can be any party that is scouring the network for message communications 13 or intermittently looking for message communications 13. According to one example, Eve 19 may be targeting the messages 13 and may already have access to some information about the sender 10, recipient 12, or messages 13.

Sender 10 may have a computer resource that generates the communication message 13. The communication message 13 can include contents which may need to remain secret or otherwise protected. However, the communication message 13 may also include other ancillary information that is separate from the contents or subject of the communication message 13. For example, the ancillary information may include the time when the communication message 13 was generated, the information of the person (i.e., the sender 10) who generated the communication message 13, the digital size of the communication message 13 or the size of an attachment to the communication message 13, the identification of the intended recipient 12, and other information un-related to the contents of the message 13 but related to identifying information external to the contents thereof.

The OTP 14 is an unconditionally secure encryption technique that is very difficult or cannot be cracked and may include the use of a one-time pre-shared key 16A, 16B the same size as, or longer than, the message 13 being sent. In one implementation, a plaintext may be paired with a random secret key 16A. Then, each bit or character of the plaintext is encrypted by combining it with the corresponding bit or character from the pad using modular addition (e.g. XOR). If the key is truly random, is at least as long as the plaintext, is never reused in whole or in part, and is kept completely secret, then the resulting ciphertext will be virtually impossible to decrypt or break. Thus, encryption via OTP 14 is associated with key 16A such that only that specific key 16A, or an exact duplicate thereof (e.g. recipient key 16B, as discussed below) will allow decryption of an encrypted message 13'. Accordingly, if keys 16A, 16B are both lost or damaged, a message 13 encrypted via OTP 14 cannot be recovered.

The OTP 14 encryption can occur upstream from the network 18 prior to the message 13 moving along pathway 17. In one particular embodiment, the OTP 14 encryption of message 13 occurs after sender 10 composes message 13. In other implementations the OTP 14 encryption occurs continuously during the generation of message 13. Alternatively, the OTP 14 encryption may occur when the message 13 is created but prior to any of the actual contents being composed therein. The manner in which the OTP 14 encryption occurs will be discussed in greater detail below.

While OTP is referenced and discussed herein, it will be understood that other encryption techniques can be employed, including, but not limited to, Vernam cipher, additive stream cipher, and the like.

System 1 further includes noise data 21 (also referred to herein simply as noise) moving in pathway 17 and in other pathways throughout network 18. The noise data 21 is meaningless digital information or digital data that flows (i) upstream-to-downstream, (ii) downstream-to-upstream, or (iii) both upstream-to-downstream and downstream-to-upstream, simultaneously. The noise data 21 may be generated by the computer resource of the sender 10 or may be generated via the computer resource of the recipient 12 or may be generated via other nodes (not shown) as part of the network 18. Noise data 21 generates noise in the network that is purposefully configured to confound Eve 19. Noise data 21 may include digital information that is completely unrelated to the communications message 13. Noise data 21 may be generated through randomized generators that create arbitrary signals via bits of information in a randomized generator. According to one aspect, randomized generators may participate in the network for purposes of generating noise data 21 or for any other desired purpose.

In one example, noise data 21 may be generated on a continuous and ongoing basis, ceasing only when a specific network participant leaves the network 18 or when the network 18 itself is disbanded or otherwise discontinued. In instances of a particular network participant leaving, noise data 21 being generated to and/or from that particular participant can cease, only as it relates to the specific participant. In those instances, noise data 21 may continue to be generated and transmitted throughout network 18 by any and/or all remaining participants, including randomized generator participants.

According to one aspect, noise 21 can be configured to have identical parameters as message 13 in that both message 13 and noise 21 can have the same format and appearance. Further according to this aspect, both messages 13 and noise 21 can be encrypted using the same encryption technique, such as OTP 14, and can have the same transmission protocol such as transmission rates and transmission frequency.

It is the intention of the system 1 for recipient 12 to receive message 13 and be able to unencrypt the encrypted message 13' with the recipient key 16B. The recipient key 16B may be provided to recipient 12 prior to the generation of message 13 in the computer of sender 10. However, it is entirely possible that key 16B be provided to recipient 12 subsequent to the generation of message 13 by sender 10. In one particular implementation, key 16B is a direct copy of key 16A. However, key 16B may also be a replica of key 16A. In other instances, key 16B may be a duplicate of key 16A. In each instance, key 16B may be configured to decrypt an encrypted message 13' once received by recipient 12.

Having thus described the exemplary aspects of communication system 1, the communication protocol of system 1 is now discussed. The first component of the communication protocol relates to encryption algorithms used to encode the contents and ancillary data of message 13. Second, the communication protocol involves a constant flow of noise data 21 within the communications network 18 to both mask when the communications message 13 is being sent and prevent Eve 19 from learning information about the size, or any other ancillary information related to message 13. Finally, the third component of the communication protocol involves the integration of the first two components with an anonymity network 18 to block Eve 19 from learning who sent the communications message 13, to whom the communications message 13 was sent, what location the communications message 13 is sent from, and to what location the communications message 13 was sent.

Encryption of the contents of message 13 can ensure that the contents are not readily obtainable or discernible within communications network 18. The use of an unconditionally secure process, such as OTP 14, can provide a secure encryption scheme that is mathematically very difficult or impossible to decrypt without access to a unique, one time use key 16A, 16B that is specific to the message being sent. The OTP 14 works by creating an encryption scheme where all possible decryptions are equally likely which can ensure that no person can gain information from the encrypted data without the key 16A, 16B. OTP 14 operates by randomly changing each single bit of data contained within a message to a 1 or a 0. Since every bit is randomly switched on (1) or off (0), the output from the OTP 14 is a completely random number. Because the OTP 14 output is completely random, it is nearly impossible to reverse the encryption without knowing which result (1 or 0) was selected for each bit at the time of the encryption.

The key 16A, 16B may be an equally random number composed of 1's and 0's that is generated by the OTP 14 separately from the message. The key 16A, 16B may be generated before, after, or simultaneous to the message 13 by OTP 14. In one particular example, key 16A is generated in advance. Alternatively, the key 16A can be an extremely long sequence of 1's and 0's, exceeding the length of a message 13. According to this aspect, a portion of the key 16A, 16B may be used to decrypt the encrypted message 13'. Once key 16A, 16B is used to decrypt a message 13', the key 16A, 16B, or the portion of the key 16A, 16B that has been used, is destroyed. If a key 16A, 16B, or a portion thereof, is used more than once, the system 1 may be susceptible to breach.

In secure communications utilizing the OTP 14, the recipient key 16B is distributed to each possible recipient of the messages, and is stored for use later when messages are received. This system 1 is dependent upon the ability to generate the random key 16A, 16B and to securely deliver the recipient key 16B to the communication recipient 12. Distribution of key 16A and recipient key 16B is further discussed below.

In one particular example, communications message 13 sent using OTP 14 encryption can be decrypted with the key 16B by the recipient 12 by utilizing the "exclusive OR" ("XOR") function. XOR refers to "one or the other, but not both" and when the key is applied, the system compares the 1's and 0's in the key to the 1's and 0's in the message using a XOR truth table to decode the communication. If the key 16B and the encryption of communications message 13 does not line up properly, the message will not be decrypted and the key 16B can be preserved for comparison to future messages.

An OTP 14 therefore provides encryption that is, theoretically speaking, unconditionally secure. However, the encryption of plain text by an OTP could allow Eve to infer some information about the plain text using frequency statistics. If the random number generator (RNG) used is in actuality a pseudo random number generator (PRNG) then Eve 19 can potentially break the encryption.

Accordingly, one embodiment of the present communication protocol of communication system 1 may provide additional steps to mitigate this risk. Specifically, plain text communications can first be encrypted using a first layer of encryption (for example, an advanced encryption standard (AES) such as AES256, or by another encryption method), before applying a second layer of encryption using an unconditionally secure encryption process, such as OTP 14, to randomize the data. In one particular implementation, this can prevent Eve 19 from using frequency statistics to gain any information, ancillary or otherwise, about the message 13.

The communication protocol of communication system 1 further assumes a random oracle, i.e. a perfectly random system. This means that the random number generators utilized with the present communication protocol are true random number generators (TRNG), with completely different entropy sources. This can provide that the random numbers generated share no entropy, and can be combined together, using XOR functions, to produce a hybrid RNG, which can protect against any potential weakness in any particular TRNG. To break this system, Eve 19 would need to be able to determine many different non-deterministic physical phenomena, which (given the current understanding of physics) amounts to a physical impossibility. Thus, the security of the present communication protocol of communication system 1 is founded on the immutable laws of physics and mathematics and is unconditionally secure.

While the OTP 14 encryption, as discussed above can provide unconditional security to the contents of communications message 13, Eve 19 may still obtain information relating to whether or not a message is being sent, the size of the message, the location of origin of the message, and the sender and/or recipient of the message. This information can help Eve 19 determine why messages are being sent. Armed with a series of times, message and file sizes, senders, and recipients, Eve 19 can learn a lot about the organization and how that organization functions. For example, if there is relative silence within a communications network when a significant event occurs, and shortly thereafter a flurry of communications take place, Eve 19 can infer or deduce that these communications are related to the event. If Eve 19 has access to file storage systems, Eve 19 could then compare file sizes from the messages to files in the system, and may be able to determine what files are being sent, to whom they are being sent, and who is sending them. In matters of military information or national security, access to such information can pose a threat to those involved.

To further prevent Eve 19 from gaining knowledge about the communications network 18, the present communication protocol of communication system 1 utilizes a constant, or at least frequent, flow of noise data 21 throughout the network 18. Using a simplified example, if Alice 10 (i.e., sender) and Bob 12 (i.e., recipient) are two sole members of a communications network, the present communication protocol of the communication system 1 would send constant, or at least frequent, communications of random, noise data 21 back and forth between Alice 10 and Bob 12. Thus, the activity on the communications network 18 would remain the same at all times, and Eve 19 would not be able to tell when a communication message 13 is being sent compared to when the network activity is just noise 21.

In one example, if there are variations or patterns to the sending of noise data 21 across the network, Eve 19 may be able to run temporal analysis and still be able to garner information about which activity is a communication versus which activity is merely noise 21. For example, if the noise data 21 is sent at a different speed than communications, or at specific intervals, activity that occurs outside of these parameters can be flagged by Eve 19 as potential communications. If those flagged activities within the network correlate to other events, such as in the example above, Eve 19 may be able to determine when communications are being sent and why they are being sent. Thus, in one particular embodiment, noise 21 parameters equal or mimic the parameters of a communication message 13 or encrypted communications message 13'.

To prevent such variations in network activity, one solution calls for the communication protocol of communication system 1 use noise data 21 which is put through identical transformations as the communications message 13 so that every instance of activity on the communications network 18 of system 1 appears uniform and has the same properties. This should prevent any determinable difference in communications message 13 versus noise data 21 as viewed by Eve 19. Specifically, this means that noise data 21 is encrypted first by a first layer of encryption, such as AES, and then encrypted by a second layer of encryption, such as OTP 14, prior to sending noise data 21 through network 18.

The combination of OTP 14 encryption and constant sending of noise 21 can prevent, or at least significantly reduce, Eve 19 from determining if and when a communications message 13 is sent, the size of any communication being sent, and the contents of any communication being sent, but it is still theoretically possible for Eve 19 to still determine who is sending messages (both communications message 13 and noise data 21) and to whom.

Thus, the third component of the present communication protocol of communication system 1 will now be discussed. Taking the above example of Alice 10 and Bob 12 as the only members of the communications network, it is easy to determine that Alice 10 and Bob 12 are the communicating parties. However, if Charlie (i.e., a third party) now joins the network, but the network activity is still between Alice 10 and Bob 12, Eve 19 can now surmise that Alice 10 and Bob 12 are communicating, and Charlie is not. Expound that example to (n) network participants where is "n" is any integer greater than 2, and Eve 19 can quickly begin to map the flow of information.

To combat Eve's 19 ability to determine who is sending messages and to whom, the present communication protocol 13 utilizes an anonymity network. Today these networks are commonly known as DC nets or DC networks, where DC stands for "dining cryptographers". DC nets operate to provide anonymity amongst network participants such that Eve 19 would not be able to determine who is sending a communication with more than a guess having a 1/n percent probability of success, with n representing an integer for the number of participants in the network. In a DC net, all communications are sent to all participants, so even though Eve 19 would know the recipients (all participants in the network) of a given message, Eve 19 would have the same 1/n probability of guessing who the intended recipient might be. The present protocol provides that all messages, including the communication message 13 and noise data 21 be sent through a DC network (i.e., network 18 is a DC net), thus eliminating the final bit of information Eve 19 may be able to obtain, and leaving Eve 19 with zero knowledge about the communications network 18.

In accordance with one aspect of the present disclosure, the communications protocol of communication system 1 dictates that every message, whether a communication message 13 or noise 21, is encrypted utilizing the OTP 14 and delivered to all network participants through a DC network 18, while continuously sending noise 21 into and through the network 18 regardless of whether or not a communications message 13 is being sent. The combination of these three components can completely frustrate Eve 19 from gaining any information regarding the communications network 18.

In operation and with reference to FIG. 1, an exemplary communication from Alice 10 (i.e., the sender) to Bob 12 (i.e., the recipient), following the communication protocol of communication system 1 is depicted. First, Alice 10 encrypts a communication message 13 using the OTP 14 and her private key 16A. Alice 10 then sends the communication message through the DC network 18 where it is sent to all participants in the network of system 1. Eve 19 does not know that a message has been sent, because all participants are continuously feeding the DC net 18 with noise 21, so the sending of Alice's 10 communication message 13 into the DC network 18 is indistinguishable. Alice's 10 communication message 13 is then delivered to all network participants, including the intended recipient, Bob 12. Upon receipt of the communication message, Bob 12 will attempt to decrypt the communication through the OTP 14, using his copy of Alice's 10 secret key 16B. Since Bob 12 has a copy of the key which was used to encrypt the message, the communication is decoded and Bob 12 is able to access the contents of the communication.

Eve 19 does not know that communications message 13 has been sent, because one or more participants are continuously feeding the DC network 18 with noise 21 that is then sent to all participants, so the sending of Alice's 10 communication message 13 into the DC network 18 is indistinguishable. Further, Eve 19 does not know who received a communication because Alice's 10 communication message 13 was sent through the DC net 18 to all participants. As it was indistinguishable from noise 21, Eve 19 merely sees constant and continuous activity from everyone to everyone. Finally, the OTP 14 encryption prevents Eve 19 from knowing anything about the contents of any of the messages. Thus, Eve 19 is left with zero knowledge of the communication send from Alice 10 to Bob 12, yet Bob 12 has received and can access the contents of the message.

The other recipients that are not Bob 12, also receive the communication from Alice 10, but when their own decryption attempt (using a key different from that used to encrypt the message) fails, the message is ignored and discarded.

The communication protocol of communication system 1 includes an assumption that OTP 14 key 16A can be generated and distributed (i.e., the distributed keys 16B) securely among all participants, however, in real-world applications, key distribution is subject to the same security concerns as the sending of a message 13.

According to one aspect, a key 16A, 16B can be hand delivered to each recipient. For example, between Alice 10 and Bob 12, a key can be delivered personally. As the number of network participants grows however, this distribution method becomes unwieldy and impractical. For example, if Alice 10 and Charlie want to communicate, a separate key must be generated and delivered. Likewise a third key must exist for Bob 12 and Charlie to communicate. Extrapolate this across a network with n participants, and it causes an explosion in the (n−1 triangular) number of keys required because every individual is required to have n−1 keys.

Figure 2:
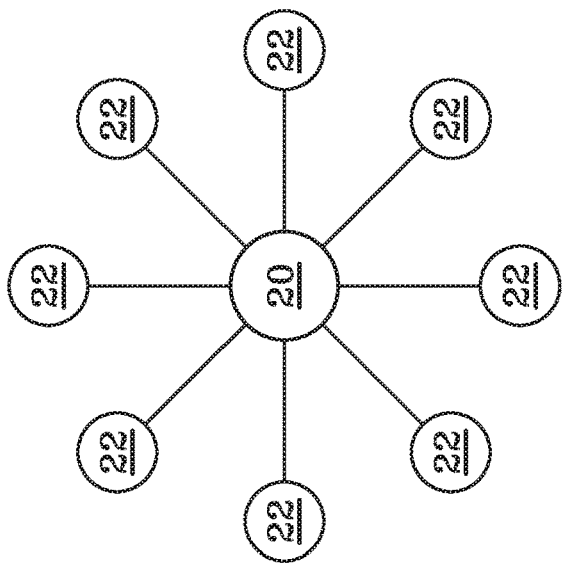
FIG. 2 is a schematic view of a spoke and hub communications network in accordance with one embodiment of the disclosure.

According to one implementation, this problem can be avoided through the incorporation of a hub and spoke model (which may also be referred to as a spoke and wheel) for the distribution of and retention of keys 16B. With reference to FIG. 2 a spoked wheel is shown having a hub 20 and a plurality of spokes 22. Though shown in FIG. 2 with eight spokes 22, implementation of the present protocol will dictate the number of spokes 22 used as each spoke 22 represents a single participant n from the communications network 18.

According to one aspect, hub 20 can be a dedicated and trusted server that can store a copy of each participant's secret key 16A. This allows each participant to need only a single key 16B corresponding to the hub 20, rather than the need for n−1 keys. Accordingly, when a new participant joins the communications network 18, a new spoke 22 is created and the new participant needs only to upload his or her key 16A to the hub 20 and receive the corresponding key back from the hub 20. Participants then simply send all communications to the hub 20 while denoting the intended recipient 12 in the communication. The hub 20 can then deliver the communication to the intended recipient 12.

According to this aspect, the hub 20 can receive all messages, including both communication messages 13 and noise message 21, can run decryption on every message, and can send communications on to the intended recipient. Although the use of the hub 20 permits Eve 19 to know that the hub 20 is either a sender or recipient of every message, the fact that the hub 20 functions solely as a pass-through, Eve 19 will still have only a 1/n probability of correctly guessing who the sender and/or intended recipient are, and a $1/n^2$ probability of knowing both the sender and intended recipient. As all participants are continuously sending noise 21 to and receiving noise 21 from the hub 20, Eve 19 still receives zero knowledge and the communications network 18 remains unconditionally secure.

Although the hub and spoke model is one implementation that can solve the key distribution problem, it will be understood that other distribution solutions may be implemented without deviation from the scope herein. By way of one non-limiting example, keys 16A, 16B can be distributed using quantum cryptography which can allow the physical detection of the presence of an eavesdropper 19 within the distribution network. If Eve 19 is detected, keys 16A, 16B can be withheld until Eve 19 is no longer present. This can prevent key 16A, 16B from being intercepted. Other examples include, but are not limited to; physics based distribution methods, information theoretic secure key distribution methods, or even computationally secure key distribution methods (if one is willing to make the protocol computationally rather than information theoretically secure), or the like.

In order to prevent Eve 19 from discovering when (i.e., the time) that message 13 is or is not sent, system 1 sends random data (i.e., noise 21) over the DC network 18 when messages 13 are not sent. Noise 21 may be generated by the sender 10, the recipient 12, or other network participants that are merely decoys (i.e., at least one decoy network participant). More particularly, a decoy network participant, or decoy, as used herein, can be a participant that can generate noise data 21 to be delivered into the network 18 on a continuous and ongoing basis without regard to the sending or receiving of an actual encrypted message 13'. According to one aspect, the decoy network participant can be the sender 10. According to another aspect, the decoy network participant can be the recipient 12. According to another aspect, the decoy network participant can be a third-party, or alternatively, all third-party, network participants who are neither the sender 10 nor the recipient 12 of a particular message 13. According to another aspect, the decoy network participant can be one or more randomized generators, which can be one or more automated computing resources within the network 18 that appear to Eve 19 as normal network participant and are thus indistinguishable from other network participants.

However, if a spoke 22 sends random data over the DC network 18, it may prevent any other spoke 22 from sending data, whether message 13 or noise 21, at the same time. To solve this problem, system 1 may divide the overall bandwidth into rounds with n shares, and have the hub 20 randomly assigned shares to each network participant, such that each member gets at least one share. In one particular embodiment, each network participant receives exactly one share. Then, according to one non-limiting example, for each round, each member of the network will be given their fair share of the network bandwidth, and will know when it is its turn to send a message 13 or random data noise 21. Since the service hub 20 will randomly assign members to their share in any given round, and Eve 19 will still have only 1/n probability of guessing who is sending or receiving a message.

The format of shares can vary depending on the implementation of system 1 and can be chosen by a person of skill. By way of a non-limiting example, shares can represent equal numbers of bits per round, with the total bits being sent in a single round represented by 100% and each participant receiving n/100 percent of bits being sent.

By way of another non-limiting example, shares can be randomly assigned based on time, with each participant receiving the same amount of sending time per round. According to this example, sending time can be broken into n intervals, with a first interval $t_0$-$t_1$; a second interval $t_1$-$t_2$; a third interval $t_2$-$t_3$; and so forth up to $t_n$. Then, hub 20 can assign these intervals equally and randomly to network participants such that each participant gets an equal number of time intervals allotted each round, and in a random order.

According to another embodiment, system 1 can send data through network 18 a predetermined intervals, sending message 13 data when a message 13 is present and sending noise data 21 when a message 13 is not present. Illustrated by way of one simplified and non-limiting example, system 1 can send one bit of data per second, every second. When a message 13 is composed, encrypted, and prepared to be sent, system 1 can hold message in a queue and send message at a rate of one bit/second until all message 13' data has been sent. Meanwhile, noise data 21 can be continuously generated and held in a separate queue and sent at an identical one bit/second rate every second when the message data queue is not populated. According to this embodiment, as long as noise data 21 is generated faster than the transmission rate (one bit/second in this example), the noise data 21 queue will not deplete, thus allowing the sending of data through network to remain constant and continuous.

With the hub 20 and spoke 22 model, Eve 19 may believe that the hub 20 is either the sender or the recipient of any given message 13, but since the hub 20 functions just as a pass through and is not the actual sender 10 or intended recipient 12 of messages 13, Eve 19 still has a 1/n probability of knowing who the originator 10 of any given message is, nor the final recipient 12 of any given message. Thus Eve 19 still has no way of knowing which spoke 22 is sending or receiving a message, and thus the system 1 still maintains its unconditional anonymity.

In accordance with the bandwidth example, system 1 may transmit the encrypted message 13' along pathway 17 through the communications network 18 to all network participants, including decoys and at least one intended recipient(s) 12, wherein network 18 bandwidth during transmission of the encrypted message 13' is maintained at a selected level such that an Eve 19 cannot identify that the encrypted message 13' was transmitted. Notably, it is possible that more than two network participants are the at least one intended recipient and can share the same key. Stated otherwise, there may be more than two or more intended recipients 12.

According to this example, the bandwidth may be limited to one share or more than one share. The system 1 then can continue to transmit encrypted noise 21 subsequent to transmitting the encrypted message 13'. In furtherance with the bandwidth sharing example, system 1 may divide bandwidth into rounds with n shares, wherein n is equal to a number of network participants. Then, system 1 assigns, randomly, at least one share to network participants including decoy network participants and the at least one intended recipient 12. System 1 transmits, in rounds or in a round-robin manner, either one of the encrypted noise 21 and the encrypted message 13'.

Since noise 21 and messages 13' sent through system 1 may be put through identical transformations (e.g. encryptions) and are sent with substantially identical transmission protocol and at identical intervals, Eve 19 should have no manner to detect whether the communication is noise 21 or a purposeful message 13 for any given share.

Accordingly, the system 1 is able to manage and self-adjust for the influx of a communication message 13 into the bandwidth. The automatic self-adjustment can be to maintain bandwidth at a pre-determined level and may be accomplished through bandwidth adjustment logic encoded on at least one computer readable storage medium that are executable by a processor to mask bandwidth discrepancies which Eve 19 may deduce relates to a message transmission. For example, when Alice 10 needs to send a message 13 to Bob 12, the message 13 is associated with data size that occupies bandwidth. The system 1 may adjust and reduce a complementary and equivalent size of noise 21 occurring elsewhere in the network. For example, if a one megabyte file needs to be transmitted from Alice 10 to Bob 12, the system 1 may reduce noise 21 in the network 18 by an equivalent one megabyte. Thus, Eve 19 would not see a net change in the network traffic. Thus, network bandwidth may be maintained at a selected constant at all times such that there is not net resultant change in bandwidth traffic as messages 13 are sent between network participants.

Figure 3:
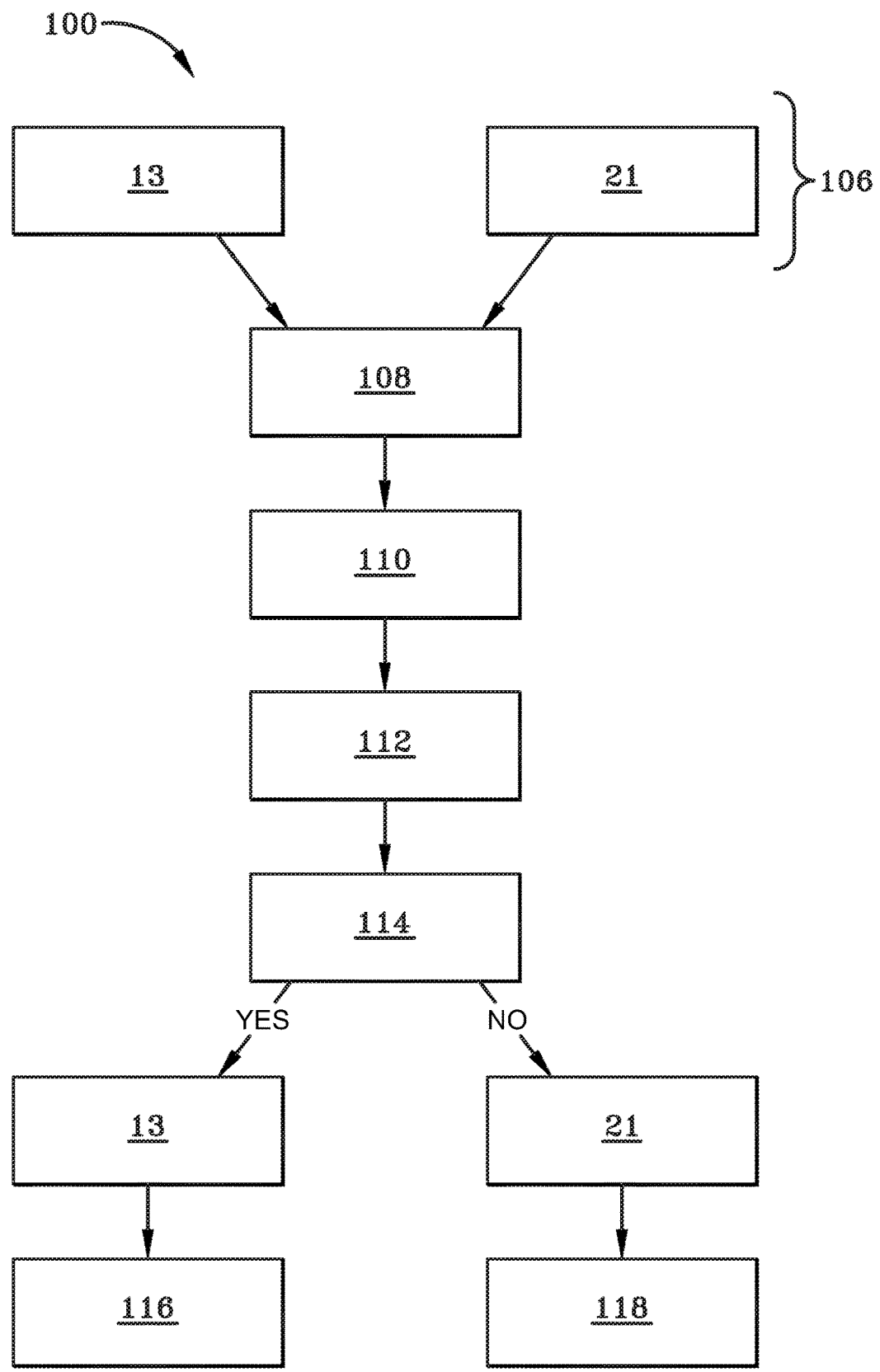
FIG. 3 is a schematic flow chart of the communications protocol as disclosed herein in accordance with one embodiment of the disclosure.

FIG. 3 depicts a flowchart of the communication protocol of the communication system 1. Specifically, process 100 is shown having the following steps: Communication message 13 is generated by one participant (sender 10) and can be sent to another participant (recipient 12) while noise data 21 message (noise 21) is simultaneously generated and may be used to obscure the message 13 and any ancillary information relating thereto. Collectively, as used in process 100, communications message 13 and noise 21 are referred to as messages 106. Noise 21 is continuously generated and put through process 100 while communications messages 13 are only generated by a participant when desired or needed.

Each created communications message 13 and/or noise 21 are then encrypted in step 108, first by a first layer of encryption, e.g. AES256, then encryption is done using an unconditionally secure process, such as OTP 14. Once encrypted, the messages 106 are sent to all participants in the communications network 18 during step 110.

Next, according step 112, all participants in the communications network 18 receive every message 106 (message 13 and noise 21) which are then compared to stored OTP 14 keys 16B in an attempt to decrypt each message 106. The decryption of each message 106 is depicted as step 114.

As discussed above, only the intended recipient(s) 12 will be successful in decrypting the message 106. Thus, if step 114 results in a successful decryption, as illustrated on the left branch from step 114 in process 100, the message 106 is determined to be a communications message 13 and is delivered to the intended recipient 12 as step 116. If step 114 results in a failed decryption attempt, as illustrated on the right branch from step 114, the message 106 is determined to be a noise message 21 and is ignored and/or discarded as step 118.

Alternatively, a failed decryption attempt in step 114 could mean the message 106 was a communications message 13, but that the participant with the failed decryption attempt is not the intended recipient 12. In this scenario, the communications message 13 for which the recipient was not the intended recipient 12 will be treated as a noise data 21 (i.e., noise 21) and ignored and/or discarded in step 118. By way of one non-limiting example, if Alice 10 sends a communications message 13 to Bob 12, Charlie will also receive the communications message 13. Since Charlie was not the intended recipient 12, he doesn't have a copy of the key needed to decrypt, thus his decryption attempt with fail, and the communication message 13 from Alice 10 will be discarded as if it were a noise data 21.

Figure 4:
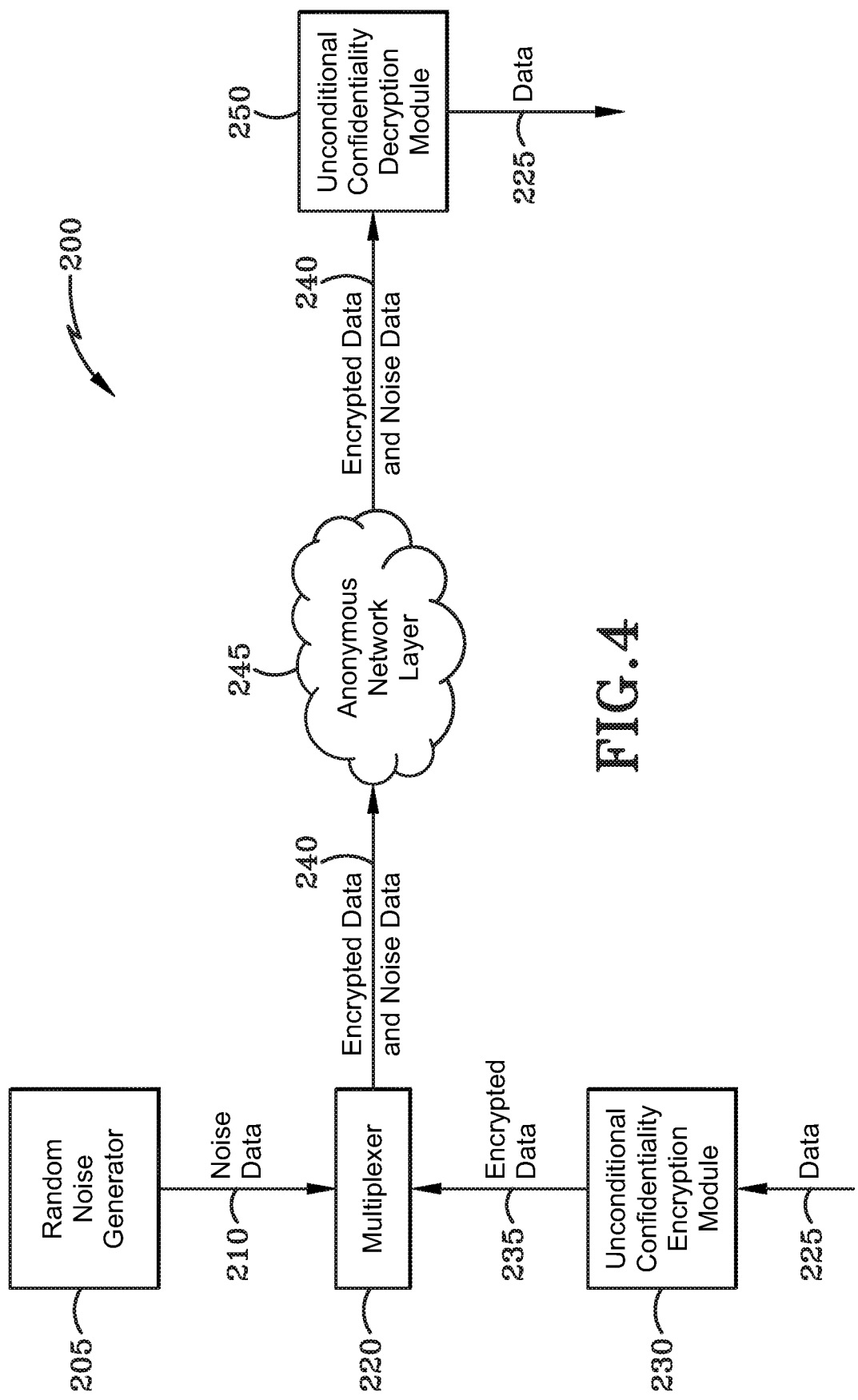
FIG. 4 is a system block diagram of the communications protocol system as disclosed herein in accordance with one embodiment of the disclosure.

Referring to FIG. 4, a system block diagram of the elements of the secure electronic communications protocol system 200 is depicted according to one embodiment. In this embodiment, the random noise generator 205 outputs a stream of noise data 210 that is an input to the multiplexer 220. In one example the noise data 210 is continuously transmitted while in another example the noise data 210 is transmitted at some duration that is less than continuous. The noise data 210 is sent from the multiplexer 220 and the noise data 240 is to the anonymous network layer 245 and is available to end users. While labeled encrypted data and noise data 240, no party can distinguish the encrypted data from the noise data and encrypted data may or may not be present at any specific instance.

At times, user data 225 is sent to the unconditional confidentiality encryption module 230 where it is encrypted. The encrypted data 235 is sent to the multiplexer 220 that transmits the encrypted data and noise data 240 to the anonymous network layer. When appropriate, the multiplexer transmits the encrypted data into the stream of encrypted data and noise data 240 to the anonymous network layer 245. Recipients, as well as any eavesdroppers, if any, can retrieve the encrypted data and noise data 240 from the anonymous network layer 245. The intended recipient(s) download the encrypted data and noise data 240 to an unconditional confidentiality decryption module 250 and using the appropriate keys is able to extract the user data 225. To the eavesdropper and those without the appropriate keys, the encrypted data and noise data 240 appears to be a single stream of data and is entirely devoid of information about the sender, recipient and user data.

Figure 5:
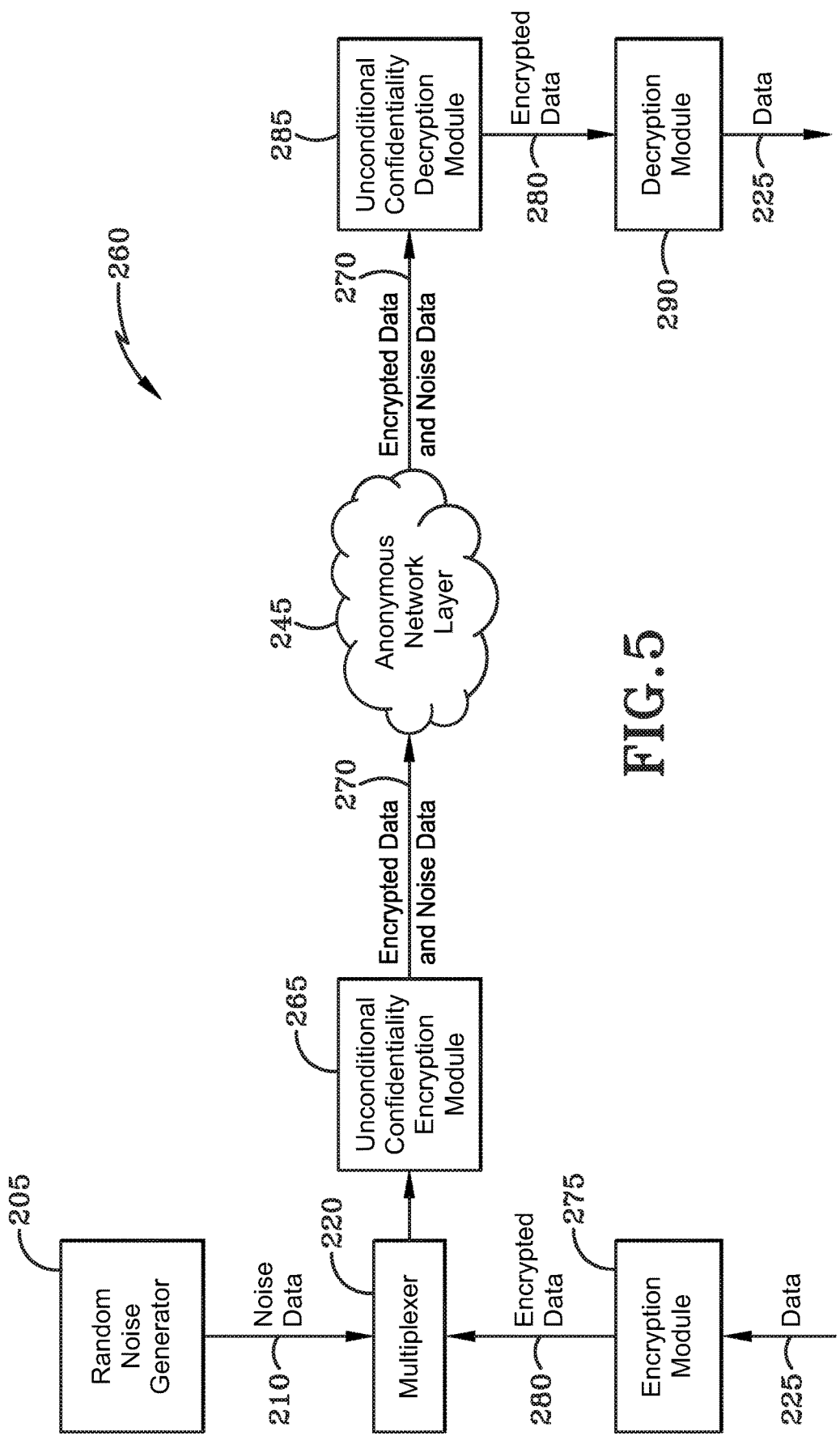
FIG. 5 is a system block diagram of the communications protocol system as disclosed herein in accordance with one embodiment of the disclosure.

Referring to FIG. 5, another embodiment of the secure electronic communications protocol system 260 is depicted. This embodiment is similar in some respects to the FIG. 4 embodiment but with certain unique aspects. The random noise generator 205 generates the noise data 210 that is an input to the multiplexer 220. The noise data 210 from the multiplexer 220 is then encrypted by the unconditional confidentiality encryption module 265 such that the encrypted data and encrypted noise data 270 are sent to the anonymous network layer 240. The user data 225 is an input to an encryption module 275 that generates encrypted data 280. This encrypted data 280 is sent to the multiplexer 220 that, when appropriate, transmits the encrypted data 280 to the unconditional confidentiality encryption module 265. The stream containing noise data 210 and encrypted user data 280 is encrypted by the module into the encrypted user data and noise data 270 and sent to the anonymous network layer 240. The encrypted user data and noise data 270 is retrievable by recipient(s) and can be decrypted by using the appropriate key in the unconditional confidentiality decryption module 285. The output from the module 285 is the encrypted data 280 that can then be decrypted by the decryption module 290 into user data 225.

Figure 6:
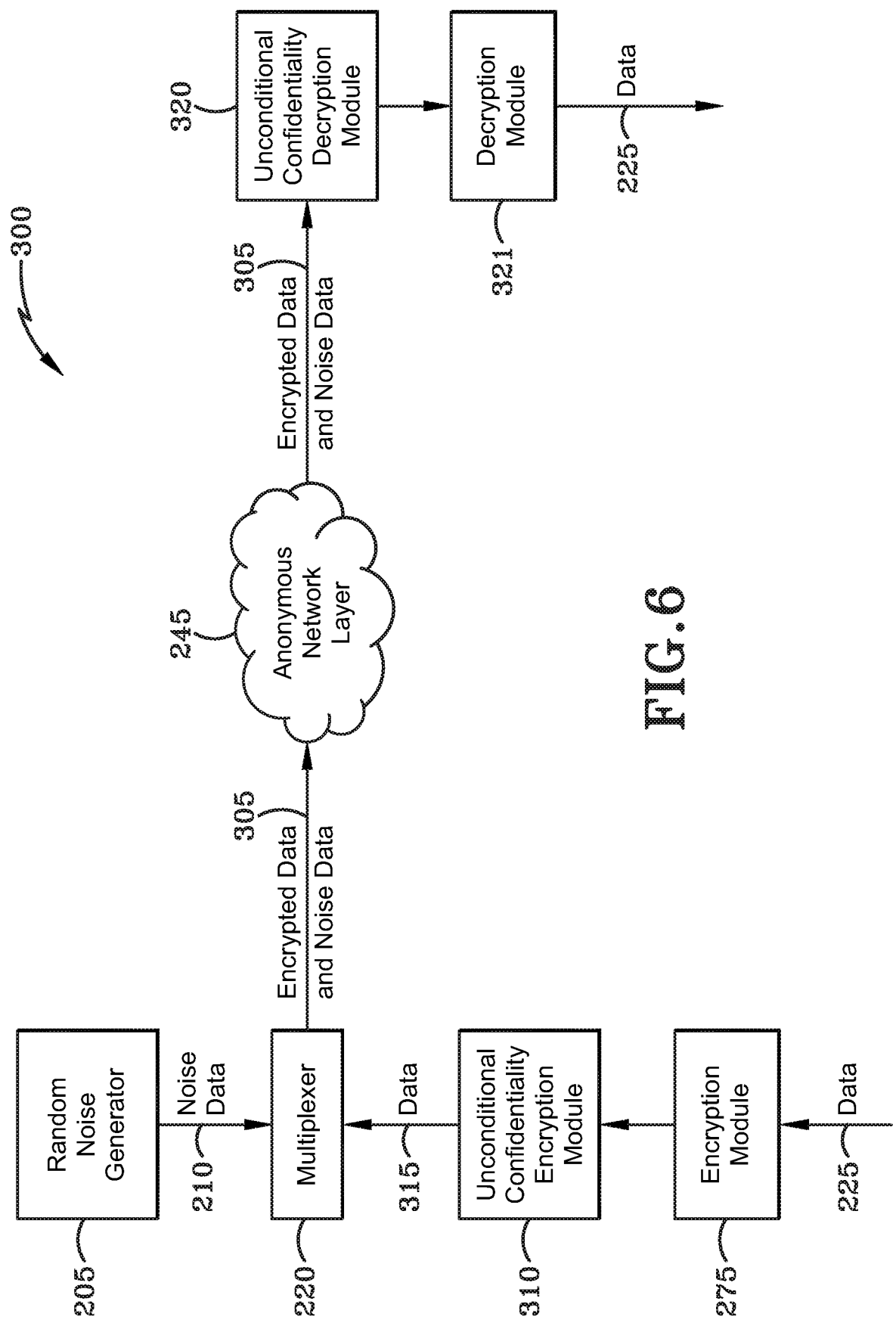
FIG. 6 is a system block diagram of the communications protocol system as disclosed herein in accordance with one embodiment of the disclosure.

FIG. 6 shows yet another embodiment for the secure electronic communications protocol system 300. In this example the random noise generator 205 generates the noise data that is input to the multiplexer 220. The noise data is part of the stream of encrypted data and noise data 305 to the anonymous network layer 240. The user data 225 is input to an encryption module 275 and is then input to an unconditional confidentiality encryption module 310 to generate the encrypted data 315. The encrypted data 315 is an input to the multiplexer 220 that, when appropriate, transmits the encrypted data 315 into the encrypted data and noise date 305 to the anonymous network layer 240. The recipient(s) are able to retrieve the encrypted data and noise data 305 and decrypt using the appropriate key in the unconditional confidentiality decryption module 320 and a decryption module 321 to extract the data 225.

Figure 7:
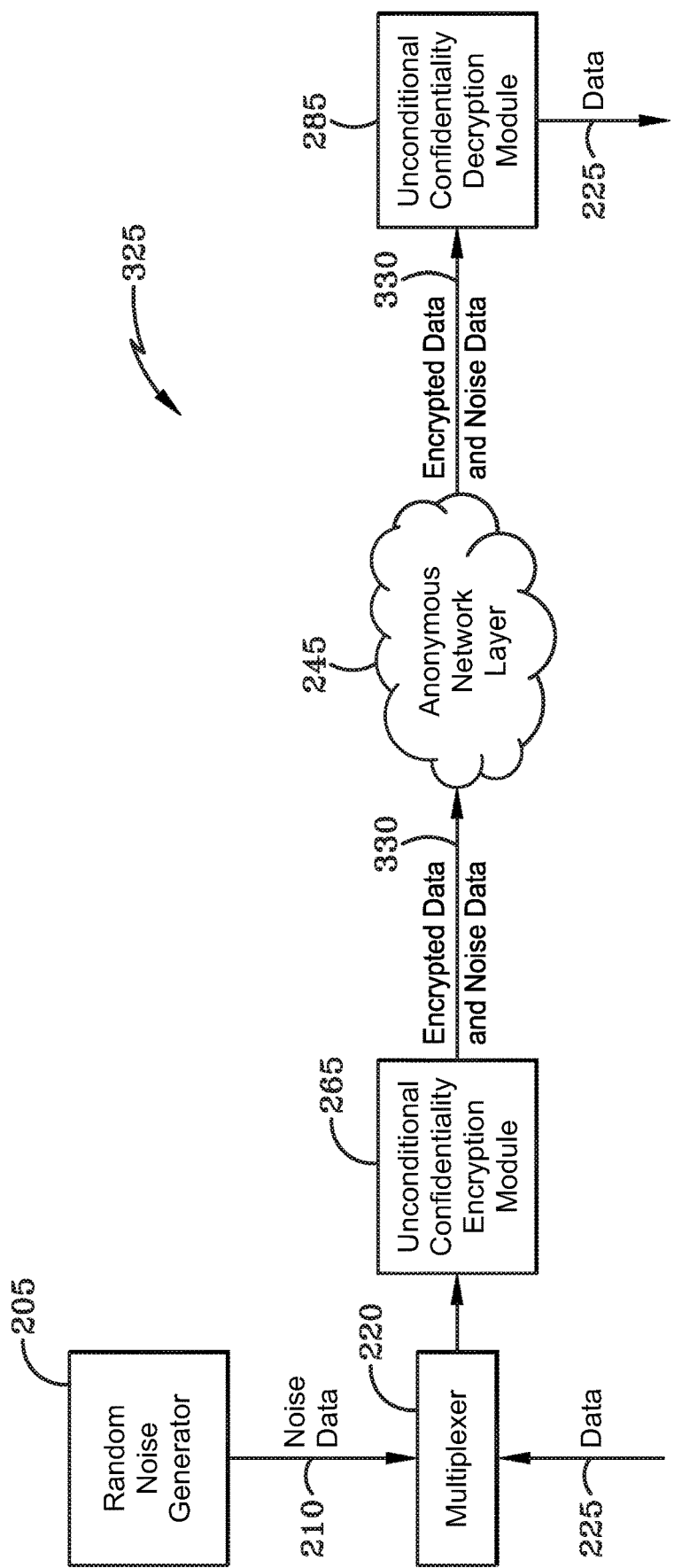
FIG. 7 is a system block diagram of the communications protocol system as disclosed herein in accordance with one embodiment of the disclosure.

Referring to FIG. 7, a further embodiment of the secure electronic communications protocol system 325 is shown. The random noise generator 205 generates the noise date 205 that is an input to the multiplexer 220. The noise data from the multiplexer is an input to the unconditional confidentiality encryption model 265 that generates the encrypted data and noise data 330 which is transmitted to the anonymous network layer 240. The user data 225 is also an input to the multiplexer 220 that, when appropriate, is sent to the unconditional confidentiality encryption model 265 that generates the encrypted data and noise data 330 that is communicated to the anonymous network layer 240. The recipient(s) that access the encrypted data and noise data 330 decrypt the signal using the unconditional confidentiality decryption model 285 to obtain the user data 225.

Although various actions and steps are described herein as being performed by individuals and/or network participants, it will be understood that much of the presently disclosed protocol can be performed by a computer or logic system having been preprogrammed with the protocol herein. It is therefore inherent in certain steps or acts described herein that these steps may be performed automatically and without a user's knowledge or input. By way of one non-limiting example, one such step performed automatically and without user's knowledge or input can be the continuous generation, encryption, and sending of noise messages 21 to the communications network 18 of system 1.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of providing secure communications comprising:
    generating random noise data by a network participant;
    transmitting the noise data through a communication network at a first defined transmission protocol to at least one other network participant;
    generating at least one communications message by a sender and encrypting the communications message with an encryption protocol to create an encrypted message adapted to be decrypted with a key;
    ensuring that activity across the communication network appears uniform to an eavesdropper;
    transmitting the encrypted message through the communication network using the first defined transmission protocol to the plurality of network participants, such that an eavesdropper cannot distinguish the encrypted message from the noise data;
    decrypting the encrypted message by at least one intended recipient with the key to obtain the communications message; and
    continuing to transmit the noise data through the communication network and intermittently transmit the encrypted message.

2. The method of claim 1, further comprising dividing a bandwidth into rounds with n shares, wherein n is equal to a number of network participants, wherein the network participants comprise at least one of:
    the sender;
    the intended recipient; and
    any number of additional network participants;
    assigning at least one share to at least one sender; and
    transmitting, in rounds, one of the noise data and the encrypted message.

3. The method of claim 1, further comprising:
    receiving all noise data and encrypted messages by at least one network participant; and
    attempting to decrypt all noise data and encrypted messages with the key.

4. The method of claim 1, further comprising:
    encrypting the noise data with the encryption protocol prior to transmitting the noise data through the communication network.

5. The method of claim 1, further comprising:
    wherein the communication network is an anonymity network for the network participants, wherein n is equal to the number of network participants; which precludes a determination of which participant sent the encrypted message.

6. The method of claim 5, further comprising:
    generating encrypted noise data from each participant in the anonymity network and transmitting the encrypted noise data from each participant to all other participants in the anonymity network.

7. The method of claim 1, further comprising:
    encrypting the encrypted messages and noise data with an identical encryption protocol, wherein the encryption protocol is an unconditionally secure process; and
    ensuring that activity across the communication network appears uniform to an eavesdropper.

8. The method of claim 7, wherein the unconditionally secure process provides for all decryptions being equally likely.

9. The method of claim 8, further comprising:
    encrypting the encrypted messages with the unconditionally secure process and providing a doubly encrypted message.

10. The method of claim 8, wherein creating the encryption protocol where all decryptions are equally likely further comprises:
    changing, randomly, each bit of data within each of the communications message and the noise data to a 1 or a 0; and
    switching, randomly, wherein every bit is randomly switched on (1) or off (0) to output a completely random number from the unconditionally secure process.

11. The method of claim 1, further comprising:
    maintaining activity across the communication network at a constant level at all times.

12. The method of claim 1, further comprising:
    wherein the key is a random one-time key with an equal number of bits as the communications message.

13. The method of claim 12, further comprising:
delivering, securely, the one-time key to the intended recipient of the encrypted message.

14. A method of providing secure communications comprising:
continuously generating noise data;
continuously sending a stream of the noise data through an anonymity network to network participants;
generating at least one communications message;
encrypting the communications message using an unconditionally secure process providing an encrypted communications message;
encrypting the encrypted communications message and noise data with an identical encryption protocol, wherein the encryption protocol is an unconditionally secure process;
ensuring that activity across the anonymity network appears uniform to an eavesdropper;
sending the encrypted communications message through the anonymity network to network participants;
receiving the noise data and the encrypted communications message by network participants;
running a decryption protocol on the noise data and the encrypted communications message using a key; and
ignoring failed decryption attempts.

15. The method of claim 14 wherein there are no observable temporal difference when switching between sending the encrypted communications message and the noise data.

16. The method of claim 14 further comprising:
sending the noise data and the communications message to a central hub.

17. The method of claim 14 further comprising:
delivering communications messages that are successfully decrypted to at least one intended recipient.

18. A secure communications system, comprising:
a noise generator;
a multiplexer coupled to the noise generator, wherein the noise generator generates noise data that is an input to the multiplexer;
a communications message generated by a user, wherein the communications message is an input to the multiplexer, and wherein the communications message is encrypted by an encryption module using a one-time pre-shared key the same size as, or longer than, the communications message being sent;
an anonymous network that receives the noise data and the encrypted communications message wherein the noise data is continuously sent through the anonymous network and intermittently transmit the encrypted communications message; and
a decryption module for decrypting the encrypted communications message,
wherein the encrypted communications message and the noise data are transmitted using similar transmission protocols such that they are indistinguishable.

19. The system according to claim 18, wherein the encryption module is an unconditional confidentiality encryption module and the communications message is encrypted prior to input to the multiplexer, and wherein the decryption module is an unconditional confidentiality decryption module.

20. The system according to claim 18, wherein the communications message is encrypted prior to input to the multiplexer and further comprising a second encryption by an unconditional confidentiality encryption module encrypting the noise data and the encrypted communications message after the multiplexer, and further comprising an unconditional confidentiality decryption module decrypting the second decryption message prior to the decryption module decrypting the communications message.

21. The system according to claim 18, wherein the communications message is encrypted prior to input to the multiplexer and further comprising a second encryption by an unconditional confidentiality encryption module encrypting the encrypted communications message before the multiplexer, and wherein the decryption module is unconditional confidentiality decryption module decrypting the communications message.

22. The system according to claim 18, wherein the encryption module is an unconditional confidentiality encryption module and the noise data and the communications message are encrypted after the multiplexer, and wherein the decryption module is an unconditional confidentiality decryption module.

* * * * *